O. M. MUNDALE.
SEED TESTER.
APPLICATION FILED JULY 20, 1916.

1,210,675.

Patented Jan. 2, 1917.

Witnesses
H. D. Kilgore
H. L. Opsahl.

Inventor
O. M. Mundale
By his Attorneys
Williamson & Merchant

UNITED STATES PATENT OFFICE.

OSCAR M. MUNDALE, OF FROST, MINNESOTA.

SEED-TESTER.

1,210,675.     Specification of Letters Patent.     Patented Jan. 2, 1917.

Application filed July 20, 1916. Serial No. 110,315.

*To all whom it may concern:*

Be it known that I, OSCAR M. MUNDALE, a citizen of the United States, residing at Frost, in the county of Faribault and State of Minnesota, have invented certain new and useful Improvements in Seed-Testers; and I do hereby declare the following to be a full, clear, and exact description of the invention, such as will enable others skilled in the art to which it appertains to make and use the same.

My invention relates to improvements in seed testers, and particularly to seed corn testers; and, to this end, generally stated, the invention consists of the novel devices and combinations of devices hereinafter described and defined in the claims.

In the accompanying drawings, which illustrate the invention, like characters indicate like parts throughout the several views.

Figure 1:
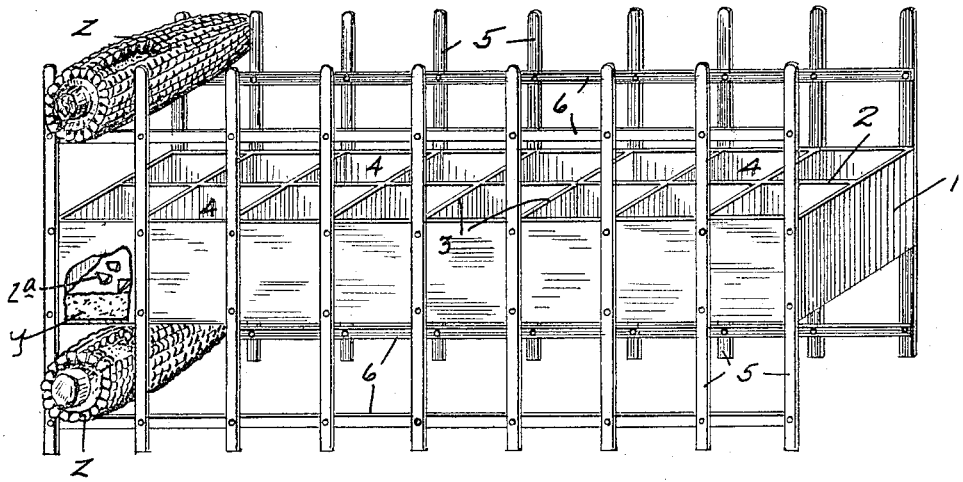
Figure 2:
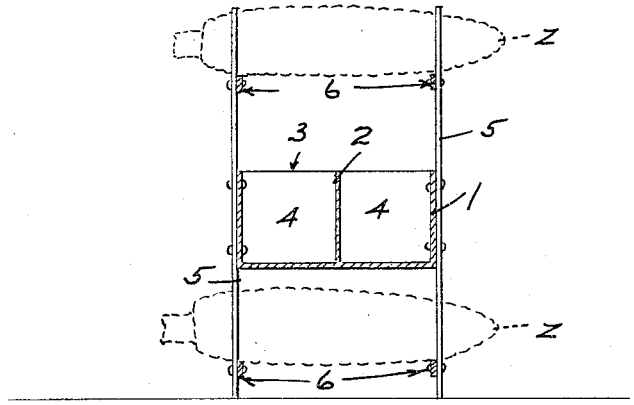

Referring to the drawings, Figure 1 is a perspective view of the invention; and Fig. 2 is a transverse vertical section with the corn-cobs indicated by means of broken lines.

The improved seed corn tester is preferably constructed entirely of metal and the numeral 1 indicates a rectangular tray having a longitudinal central partition 2 and a multiplicity of transverse partitions 3 dividing the tray into a multiplicity of pairs of transverse compartments 4.

Racks for holding a corn-cob Z for each compartment 4 are provided and made up of a multiplicity of upright bars 5 and horizontal bars 6. The upright bars 5 are rigidly secured by rivets or otherwise to the sides of the tray 1, project both above and below the same and are located in vertical alinement with the ends of the tray 1 and partitions 3. These bars 5 also afford supporting legs for the tray 1.

The horizontal bars 6 are riveted or otherwise rigidly secured to the upright bars 5 in horizontally alined pairs and located, one pair above the tray 1 and another pair below the same. The corn-cobs Z are directly supported on the horizontally alined pairs of bars 6 transversely of the tray 1 and are held laterally spaced by the upright bars 5. Obviously, with the racks thus arranged and located, with respect to the tray 1, the same has a capacity for holding two cobs of corn for each pair of transverse compartments 4. One of said cobs is located above the respective compartments and the other below the same, as shown in Fig. 1.

Within each compartment 4, is placed earth, saw-dust, or other substance that will hold moisture, and on this moistened substance in each compartment is placed several kernels from one of the ears of corn Z and the respective ear of corn is placed on the rack, either above or below the respective compartment, depending on the system the operator has devised. For instance, the ears of corn from which kernels have been taken and placed in the rear row of compartments may be placed on the top rack and the other ears from which kernels have been taken and placed in the front row of compartments, may be put on the rear rack.

It is now common practice in testing seed corn to correspondingly mark the ears of corn and spot or place where the kernels removed therefrom are placed to sprout. This method is objectionable, as it requires considerable time to do the marking and confusion often arises as the result of poor marking or the identifying characters being erased. By the use of my above described invention, such objections and confusion is eliminated.

In Fig. 1, the moistened substance on or in which the kernels $Z^a$ are placed is indicated at Y.

What I claim is:—

1. A seed corn tester comprising a tray having a plurality of compartments, and corn-cob holding racks located above and below said compartments, said racks comprising a plurality of upright bars and horizontal bars, said upright bars being intermediately secured to the sides of the tray and support the same in an elevated position.

2. A seed corn tester comprising a tray having a plurality of compartments, and corn-cob holding racks located above and below said compartments, said racks comprising a plurality of upright bars and horizontal bars, said upright bars being secured to the sides of the tray in alinement with the ends and transverse partitions thereof and projecting both above and below the tray, certain of said horizontal bars being secured to the upright bars above the tray and others thereof being secured thereto below the tray and on which horizontal bars the corn-cobs directly rest transversely of the tray.

In testimony whereof I affix my signature in presence of two witnesses.

OSCAR M. MUNDALE.

Witnesses:
E. H. WEBER,
CARL ERDAHL.

Copies of this patent may be obtained for five cents each, by addressing the "Commissioner of Patents, Washington, D C."